US011479156B2

(12) United States Patent
Funaki

(10) Patent No.: US 11,479,156 B2
(45) Date of Patent: Oct. 25, 2022

(54) LUMBAR SUPPORT DEVICE

(71) Applicant: TOYOTA BOSHOKU KABUSHIKI KAISHA, Aichi (JP)

(72) Inventor: Shohei Funaki, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 17/516,033

(22) Filed: Nov. 1, 2021

(65) Prior Publication Data

US 2022/0134922 A1    May 5, 2022

(30) Foreign Application Priority Data

Nov. 4, 2020  (JP) .............................. JP2020-184494

(51) Int. Cl.
*B60N 2/66* (2006.01)
(52) U.S. Cl.
CPC ............. *B60N 2/66* (2013.01); *B60N 2/6673* (2015.04)
(58) Field of Classification Search
CPC ........ B60N 2/66; B60N 2/667; B60N 2/6671; B60N 2/6673
See application file for complete search history.

(56) References Cited

U.S. PATENT DOCUMENTS

2010/0127543 A1\* 5/2010 Kim .................... B60N 2/66
                                                    297/284.4
2020/0001757 A1     1/2020 Son

FOREIGN PATENT DOCUMENTS

| DE | 102010039353 A1 | * | 2/2012 | ............ B60N 2/0232 |
| DE | 202011000793 U1 | * | 5/2012 | ............... B60N 2/66 |
| DE | 102011075514 A1 | * | 11/2012 | ............... B60N 2/66 |
| DE | 102017105920 A1 | * | 9/2018 | ............... B60N 2/02 |
| JP | 2020-1686 | | 1/2020 | |
| KR | 101592754 B1 | * | 2/2016 | |
| KR | 102088708 B1 | * | 3/2020 | |
| WO | WO-2018060219 A1 | * | 4/2018 | ............... B60N 2/66 |

\* cited by examiner

*Primary Examiner* — Timothy J Brindley
(74) *Attorney, Agent, or Firm* — Greenblum & Bernstein, P.L.C.

(57) ABSTRACT

Provided is a lumbar support device that can reduce a cost involved. One aspect of the present disclosure is a lumbar support device including a base, a pressure-receiving plate arranged at a seat-front side relative to the base, a hinge mechanism moving the pressure-receiving plate in seat front-rear directions, and a lead screw causing the hinge mechanism to be operable. The hinge mechanism includes a first paddle and a second paddle pivoting about a hinge pin in the seat front-rear directions. The first paddle includes a first pressing portion pressing the pressure-receiving plate toward the seat-front side and a first coupling portion coupled to a lead screw so as to be shifted in a seat-width direction as the lead screw rotates. The second paddle includes a second pressing portion pressing the pressure-receiving plate toward the seat-front side and a second coupling portion rotatably coupled to the based.

4 Claims, 6 Drawing Sheets

LUMBAR SUPPORT DEVICE

CROSS-REFERENCE TO RELATED APPLICATIONS

This application claims the benefit of Japanese Patent Application No. 2020-184494 filed on Nov. 4, 2020 with the Japan Patent Office, the entire disclosure of which is incorporated herein by reference.

BACKGROUND

The present disclosure relates to a lumbar support device.

There has been known a lumbar support device (JP2020-1686A) provided to a seat including a seatback, the lumbar support device pushing a portion of the seatback supporting the waist of an occupant toward a seat-front side, to thereby hold the occupant in a stable position.

In the above lumbar support device, ends of two links configuring a hinge structure are simultaneously moved via a lead screw along a seat-width axis, whereby an attachment plate (that is, a pressure-receiving plate) is pushed toward the seat-front side.

SUMMARY

A structure of the above lumbar support device requires a simultaneous movement of the two links in opposing directions, which thus requires increase in length of a screw thread provided to the lead screw. Consequently, a cost involved in the lumbar support device increases.

In one aspect of the present disclosure, it is desirable to provide a lumbar support device that can reduce a cost involved.

One aspect of the present disclosure is a lumbar support device configured to be attached to a back frame that supports a seatback. The lumbar support device includes a base fixed to the back frame, a pressure-receiving plate arranged at a seat-front side relative to the base, a hinge mechanism configured to move the pressure-receiving plate in seat front-rear directions with respect to the base, and a lead screw configured to cause the hinge mechanism to be operable.

The hinge mechanism includes a hinge pin, and a first paddle and a second paddle coupled to each other via the hinge pin. The first paddle and the second paddle are configured to pivot about the hinge pin in the seat front-rear directions. The first paddle includes a first pressing portion configured to press the pressure-receiving plate toward the seat-front side and a first coupling portion coupled to the lead screw so as to be shifted in a seat-width direction as the lead screw rotates.

The second paddle includes a second pressing portion configured to press the pressure-receiving plate toward the seat-front side and a second coupling portion rotatably coupled to the base.

According to the above configuration, of the first paddle and the second paddle configuring the hinge mechanism, only the first paddle is shifted via the lead screw. Thus, it is possible to reduce a length of a screw thread to be provided to the lead screw. Consequently, a cost involved in the lumbar support device is reduced.

In one aspect of the present disclosure, the hinge pin may be arranged at the seat-front side relative to the base. According to such a configuration, it is possible to simplify a configuration of the hinge mechanism. Consequently, such simplification promotes cost reduction of the lumbar support device.

In one aspect of the present disclosure, the lumber support device may further comprise a support portion attached to the back frame and supporting the pressure-receiving plate at a position upward of the hinge mechanism such that the pressure-receiving plate is pivotable in the seat front-rear directions. In such a configuration, a supporting structure of the pressure-receiving plate can be simplified and pushing of the pressure-receiving plate can be facilitated.

In one aspect of the present disclosure, the pressure-receiving plate may be configured to be displaced, via the hinge mechanism, between a retracted position and a deployed position. The deployed position may be at the seat-front side relative to the retracted position. When the pressure-receiving plate is at the deployed position, a first distance from a portion of the first pressing portion contacting the pressure-receiving plate to an imaginary plane including a center line of the pressure-receiving plate in the seat-width direction may be equal to a second distance from a portion of the second pressing portion contacting the pressure-receiving plate to the imaginary plane. When the pressure-receiving plate is at the retracted position, the first distance may be different from the second distance. According to such a configuration, it is possible to move the pressure-receiving plate in parallel with the seat front-rear directions without moving the second coupling portion of the second paddle in the seat-width direction.

BRIEF DESCRIPTION OF THE DRAWINGS

Example embodiments of the present disclosure will be described hereinafter with the accompanying drawings, in which.

DETAILED DESCRIPTION OF EXEMPLARY EMBODIMENTS

1. First Embodiment

1-1. Configuration

Figure 1:
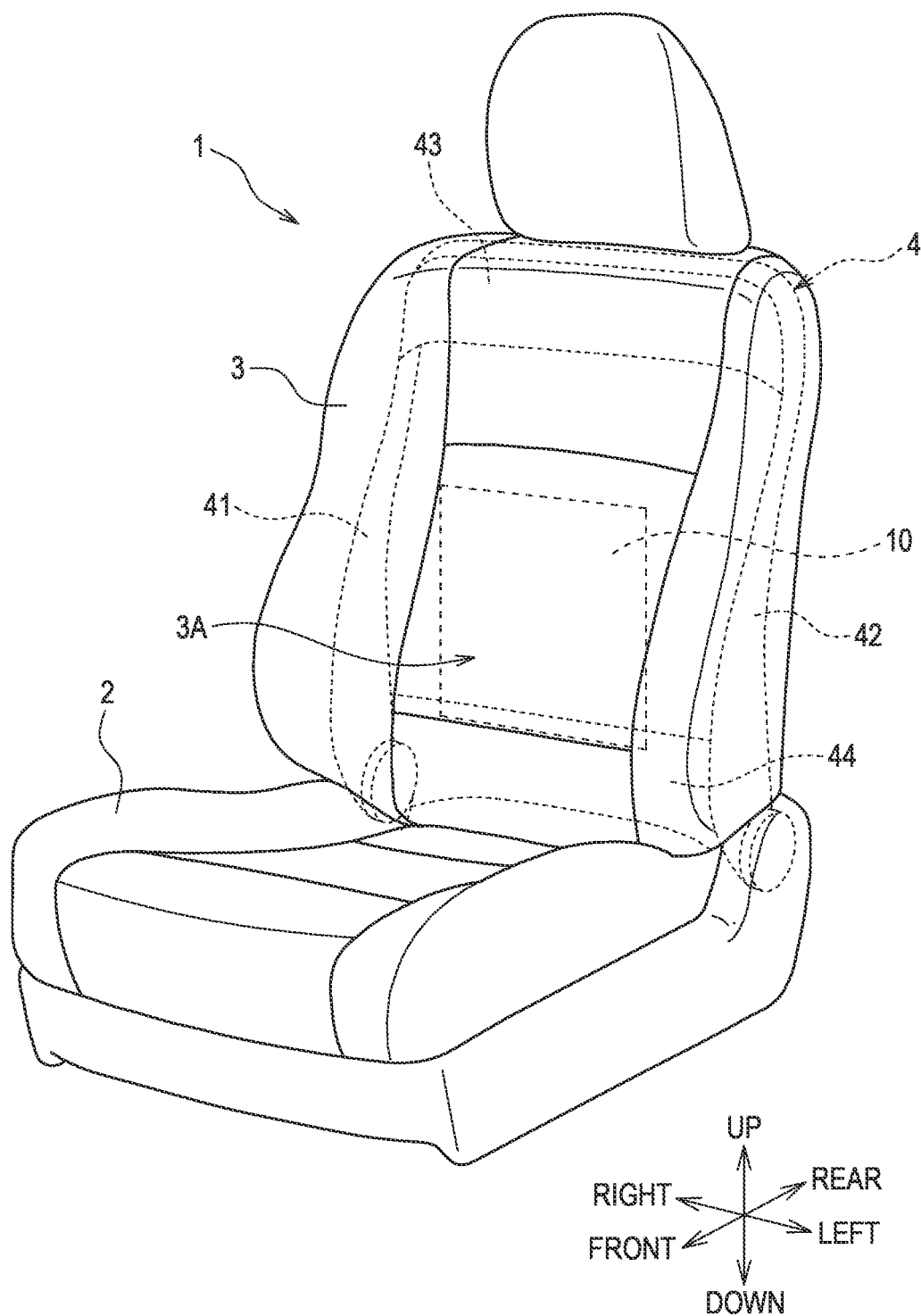
FIG. 1 is a schematic perspective view showing a vehicle seat of an embodiment.

A vehicle seat 1 shown in FIG. 1 comprises a seat cushion 2, a seatback 3, a back frame 4, and a lumbar support device 10.

The vehicle seat 1 of the present embodiment is used as a seat of a vehicle. Arrows and directions shown in the drawings and described below are based on a stats where the vehicle seat 1 is assembled to a vehicle (that is, an automobile). Furthermore, in the present embodiment, a seat width direction corresponds to left-right directions of the vehicle. A seat-front side corresponds to a front part of the vehicle.

The seat cushion 2 is a portion to support the buttocks of an occupant. The seatback 3 is a portion to support the back of the occupant. The back frame 4 supports the seatback 3.

<Back Frame>

The back frame 4 includes a first side frame 41, a second side frame 42, an upper panel 43, and a lower panel 44.

The first side frame 41 and the second side frame 42 extend in up-down directions. The first side frame 41 and the second side frame 42 are arranged to be spaced apart from each other in the seat-width direction.

The upper panel 43 couples an upper end of the first side frame 41 and an upper end of the second side frame 42 to each other in the seat-width direction. The lower panel 44 couples a lower end of the first side frame 41 and a lower end of the second side frame 42 to each other in the seat-width direction.

<Lumbar Support Device>

The lumbar support device 10 is attached to the back frame 4 and is configured to displace, in seat front-rear directions, a displacement portion 3A of the seatback 3 supporting the waist of the occupant.

Figure 2A:
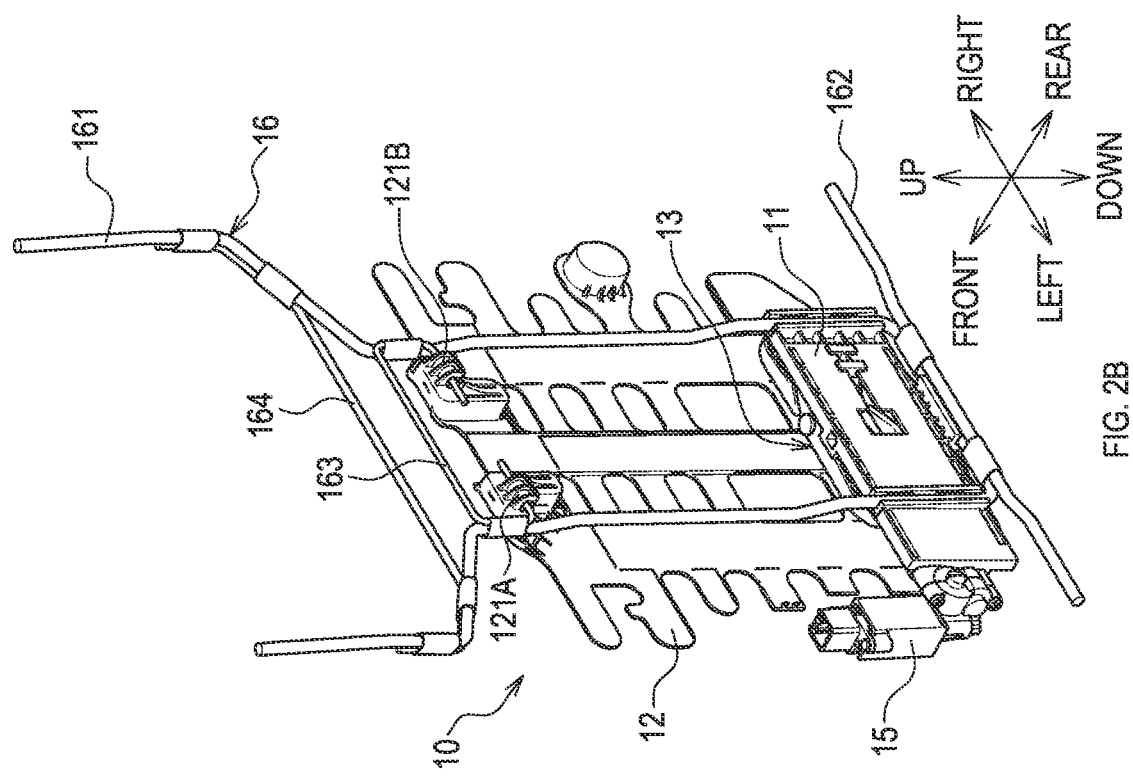
FIG. 2A is a schematic back view showing a lumbar support device of FIG. 1.
Figure 2B:
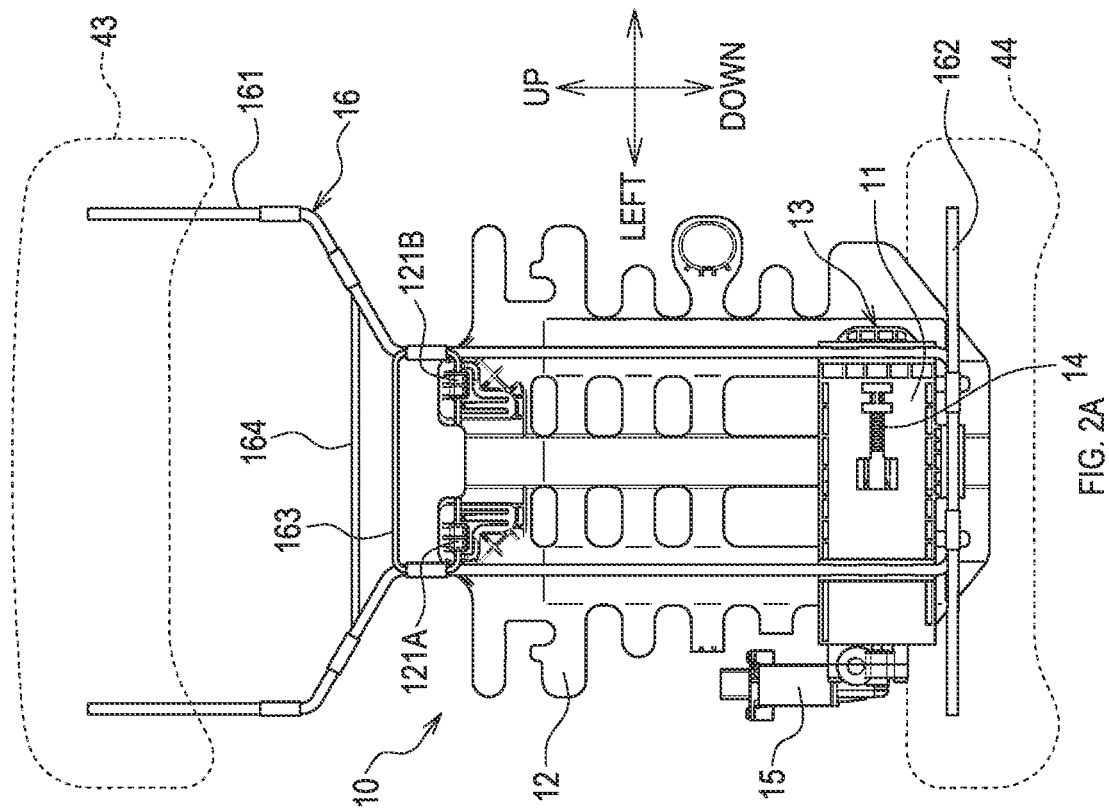
FIG. 2B is a schematic perspective view of the lumbar support device of FIG. 2A.

As shown in FIGS. 2A and 2B, the lumbar support device 10 comprises a base 11, a pressure-receiving plate 12, a hinge mechanism 13, a lead screw 14, an actuator 15, and a support portion 16.

(Base)

The base 11 is fixed to the back frame 4 via the support portion 16. The base 11 is a plate-shaped member arranged in an orientation in which a thickness direction of the base 11 corresponds to the seat front-rear directions.

Figure 3A:
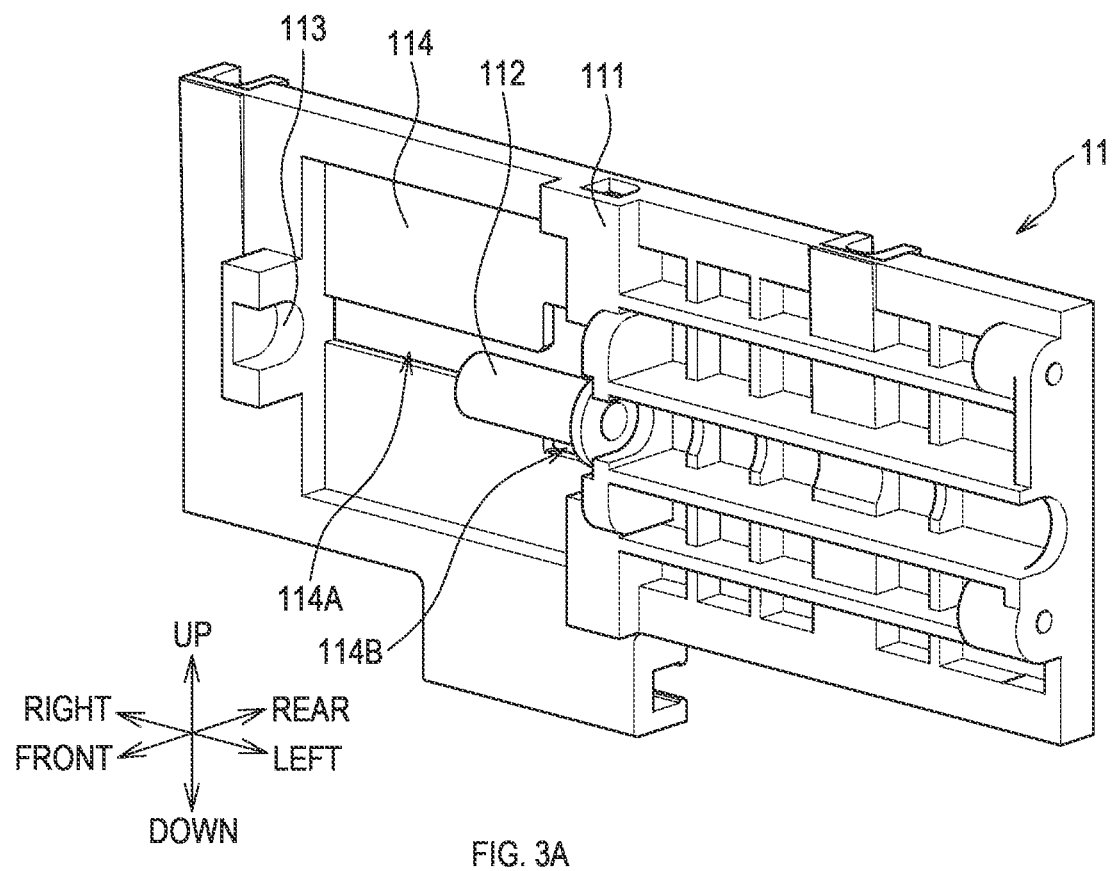
FIG. 3A is a schematic perspective view showing a base of FIG. 2A.
Figure 3B:
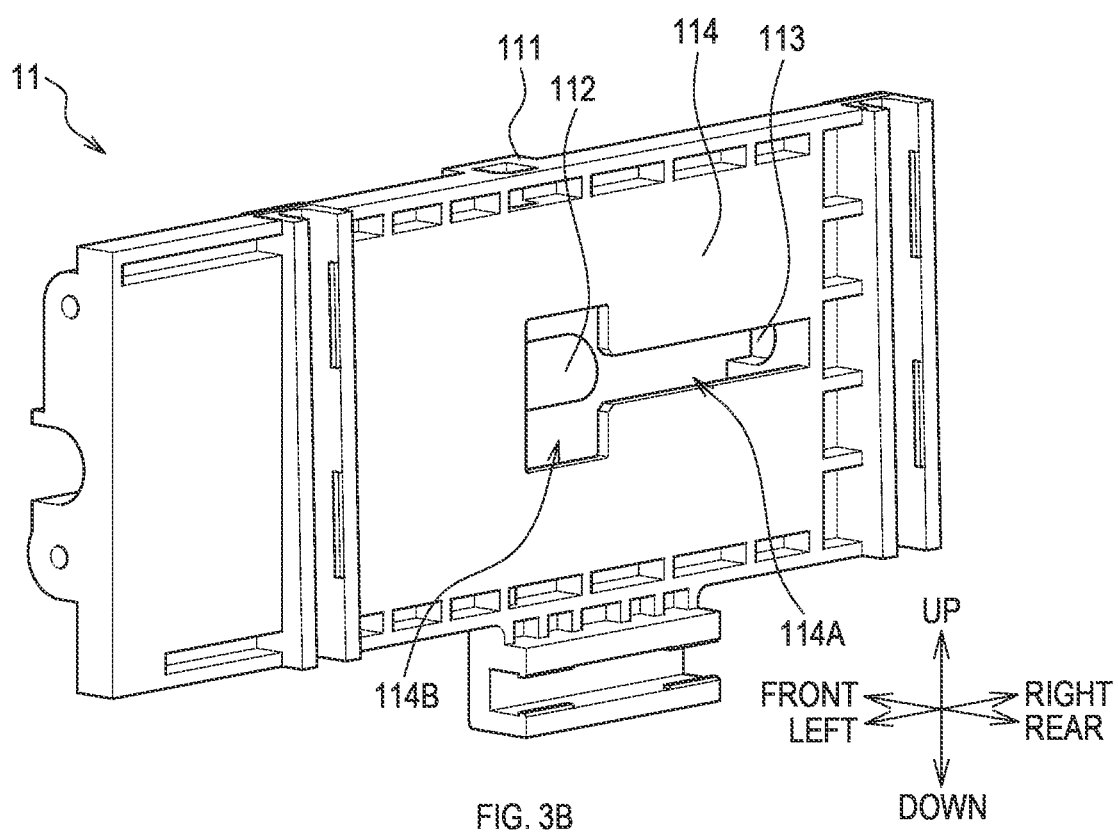
FIG. 3B is a schematic perspective view showing the base of FIG. 2A.

As shown in FIGS. 3A and 3B, the base 11 includes a first bearing portion 111, a second bearing portion 112, a third bearing portion 113, and a load receiving portion 114.

The first bearing portion 111 is coupled to a second coupling portion 133B of a second paddle 133 to be described later. The first bearing portion 111 rotatably holds the second coupling portion 133B.

The second bearing portion 112 receives the lead screw 14 therethrough. The second bearing portion 112 rotatably supports the lead screw 14. The third bearing portion 113 has a leading end of the lead screw 14 placed, thereon. The third bearing portion 113 is arranged rightward of the second bearing portion 112.

The load receiving portion 114 is a plate-shaped portion arranged between the second bearing portion 112 and the third bearing portion 113 in the seat-width direction. The load receiving portion 114 is positioned at a seat-rear side relative to the second bearing portion 112 and the third bearing portion 113. The load receiving portion 114 includes a first opening 114A and a second opening 114B.

The first opening 114A is a slit located in a position that overlaps with the lead screw 14 in the seat front-rear directions and extending in the seat-width direction. The first opening 114A receives therethrough an insertion portion 132F of a nut 132D to be described later. Furthermore, a width of the first opening 114A in the up-down directions is smaller than a width of a locking portion 132G of the nut 132D in the up-down directions.

The second opening 114B is provided to be continuous with the first opening 114A on the left of the first opening 114A. A width of the second opening 114B in the up-down directions is sized to allow insertion of the locking portion 132G of the nut 132D therethrough, and is greater than the width of the first opening 114A in the up-down directions. The second opening 114B is provided in order to engage the locking portion 132G with the load receiving portion 114 in assembling the hinge mechanism 13 to the base 11.

(Pressure-Receiving Plate)

The pressure-receiving plate 12 shown in FIGS. 2A and 2B comprises a portion supporting the displacement portion 3A of the seatback 3 from the rear side. The pressure-receiving plate 12 is arranged at the seat-front side relative to of the base 11.

The pressure-receiving plate 12 includes a first holder 121A and a second holder 121B that hold a hanging member 163 of the support portion 16 to be described later. The first holder 121A and the second holder 121B are arranged in an aligned manner in the seat-width direction.

(Hinge Mechanism)

The hinge mechanism 13 is configured to move the pressure-receiving plate 12 in the seat front-rear directions with respect to the base 11.

Figure 4A:
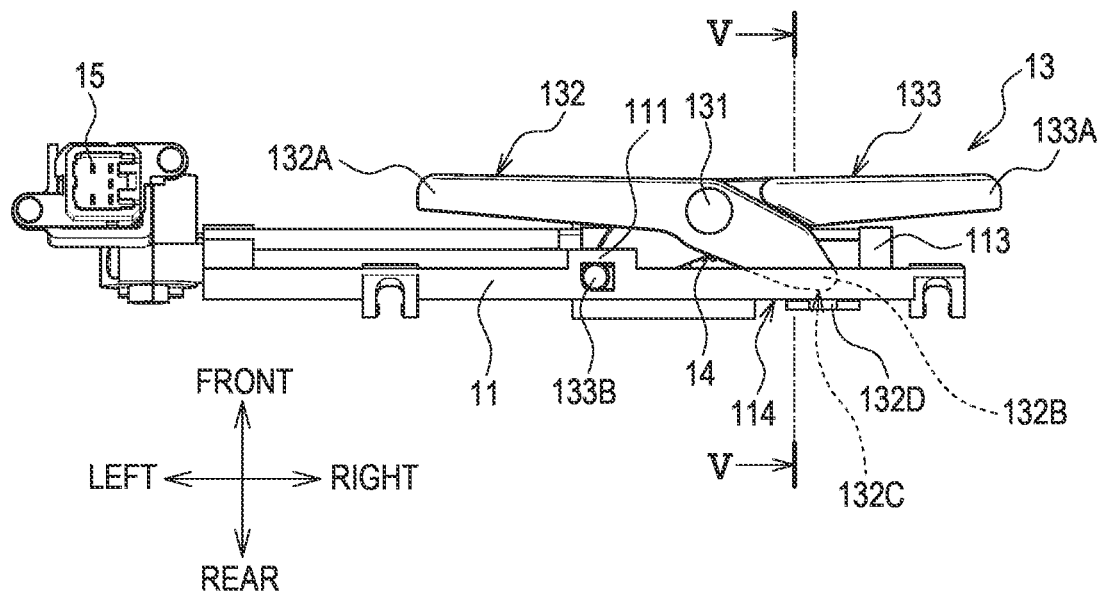
FIG. 4A is a schematic plan view showing the base, a hinge mechanism, a lead screw, and an actuator of FIG. 2A.
Figure 4B:
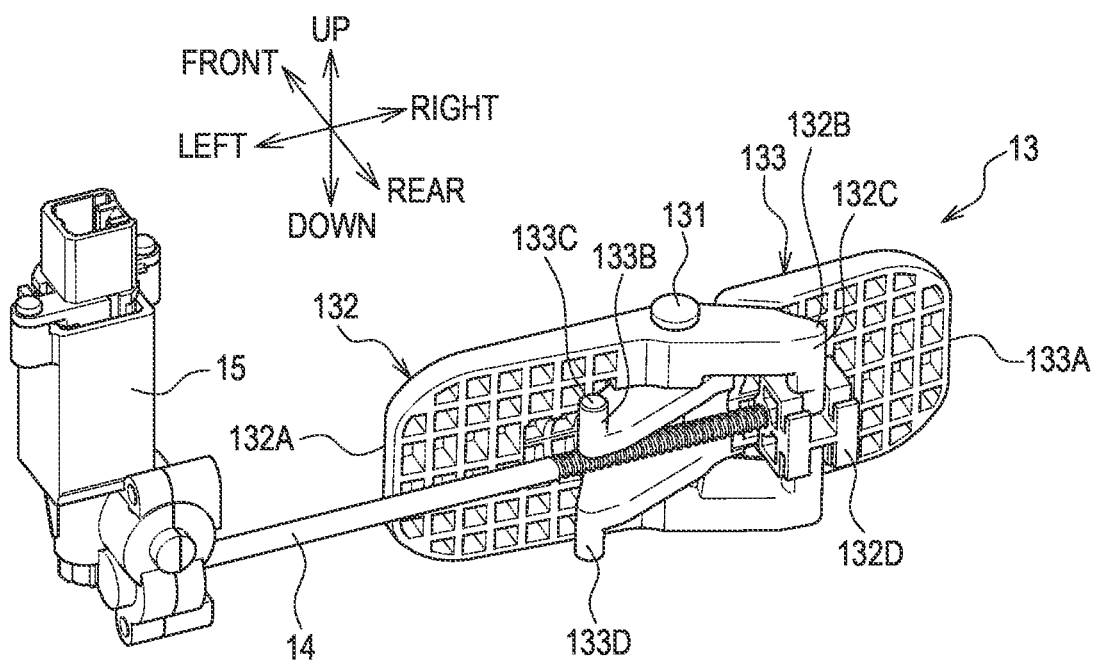
FIG. 4B is a schematic perspective view showing the hinge mechanism, the lead screw, and the actuator of FIG. 2A.

The hinge mechanism 13 is arranged at the seat-rear side relative to the pressure-receiving plate 12. As shown in FIGS. 4A and 4B, the hinge mechanism 13 includes a hinge pin 131, a first paddle 132, and the second paddle 133.

The hinge pin 131 is a rod-shaped member that comprises an axis of the hinge mechanism 13. A central axis of the hinge pin 131 is perpendicular to moving directions of the pressure-receiving plate 12. The hinge pin 131 is arranged at the seat-front side relative to the base 11. The hinge pin 131 is inserted through the first paddle 132, and the second paddle 133 in the up-down directions.

The first paddle 132 is coupled to the second paddle 133 via the hinge pin 131. The first paddle 132 is configured to pivot about the hinge pin 131 in the seat front-rear directions with respect to the base 11 and the second paddle 133. The first paddle 132 includes a first pressing portion 132A and a first coupling portion 132B.

The first pressing portion 132A is configured to press the pressure-receiving plate 12 toward the seat-front side. The first pressing portion 132A is formed in a left end of the first paddle 132. As the first paddle 132 pivots, the first pressing portion 132A is displaced in the seat front-rear directions, sliding together with the pressure-receiving plate 12.

The first coupling portion 132B is coupled to the lead screw 14 so as to be shifted in the seat-width direction due to rotation of the lead screw 14. The first coupling portion 132B includes an anteriorly arranged portion 132C and the nut 132D.

The anteriorly arranged portion 132C contacts or faces the load receiving portion 114 of the base 11 from the seat-front side. The anteriorly arranged portion 132C is formed in an end (that is, a right end) of the first paddle 132 opposite to the first pressing portion 132A across the hinge pin 131. The anteriorly arranged portion 132C rotatably supports the nut 132D.

In the present embodiment, as the first paddle 132 pivots, the anteriorly arranged portion 132C is displaced in the seat-width direction, sliding together with the load receiving portion 114. The anteriorly arranged portion 132C is a load transmitter configured to transmit, to the base 11, a load acting toward the rear side.

Figure 5:
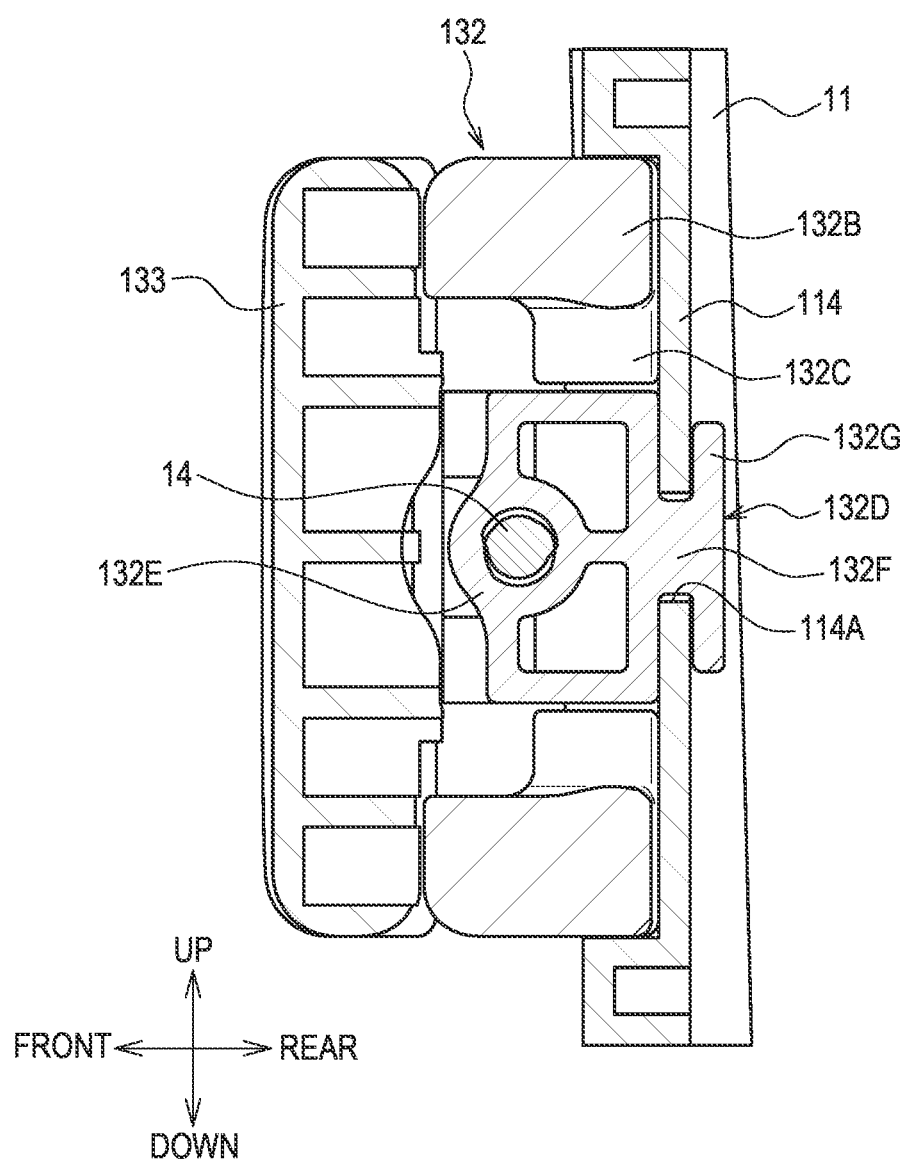
FIG. 5 is a schematic cross sectional view along a line V-V in FIG. 4A.

The nut 132D is a portion screwed to the lead screw 14 and engaged with the base 11. As shown in FIG. 5, the nut 132D includes a main body 132E, the insertion portion 132F, and the locking portion 132G.

The main body 132E comprises a tubular portion receiving the lead screw 14 therethrough. The main body 132E is provided with a thread groove in an inner circumferential surface thereof. The main body 132E is attached to the anteriorly arranged portion 132C in a rotatable manner about an axis parallel to the up-down directions. The main body 132E moves in the seat-width direction due to the rotation of the lead screw 14.

The insertion portion 132F protrudes from the main body 132E toward the rear side. The insertion portion 132F is inserted into the first opening 114A of the base 11. The insertion portion 132F moves in the seat-width direction within the first opening 114A as the lead screw 14 rotates.

The locking portion 132G is a catch arranged at the seat-rear side relative to the main body 132E and locking the base 11 from the rear side. Specifically, the locking portion 132G is coupled to a rear end of the insertion portion 132F and abuts the load receiving portion 114 of the base 11 from the rear side. The locking portion 132G is a load transmitter configured to transmit, to the base 11, a load acting toward the seat-front side.

The second paddle 133 shown FIGS. 4A and 4B is coupled to the first paddle 132 via the hinge pin 131. The second paddle 133 is configured to pivot about the hinge pin 131 in the seat front-rear directions with respect to the base 11 and the first paddle 132. The second paddle 133 includes a second pressing portion 133A and the second coupling portion 133B.

The second pressing portion 133A is configured to press the pressure-receiving plate 12 toward the seat-front side together with the first pressing portion 132A of the first paddle 132. The second pressing portion 133A is formed in a right end of the second paddle 133. As the second paddle 133 pivots, the second pressing portion 133A is displaced in the seat front-rear directions, sliding together with the pressure-receiving plate 12.

A distance from a portion of the second paddle 133 coupled to the hinge pin 131 to the second pressing portion 133A is equal to a distance from a portion of the first paddle 132 coupled to the hinge pin 131 to the first pressing portion 132A.

The second paddle 133 pivots such that a portion of the second pressing portion 133A contacting the pressure-receiving plate 12 is located at the same position in the seat front-rear directions as a portion of the first pressing portion 132A contacting the pressure-receiving plate 12. That is, the second paddle 133 pivots simultaneously with the first paddle 132 such that a displacement direction of the pressure-receiving plate 12 is parallel to the seat front-rear directions.

The second coupling portion 133B is rotatably coupled to the base 11. The second coupling portion 133B includes a first shaft 133C and a second shaft 133D. The first shaft 133C and the second shaft 133D each are a pin-like portion extending in the up-down directions. The first shaft 133C is arranged above the second shaft 133D. The first shaft 133C and the second shaft 133D are pivotably supported by the first bearing portion 111 of the base 11.

The second coupling portion 133B is inhibited from moving in the seat front-rear directions and seat-width direction by the first bearing portion 111. Thus, the second paddle 133 pivots about the second coupling portion 133B with respect to the base 11 in accordance with pivoting of the first paddle 132, to which the second paddle 133 is coupled via the hinge pin 131.

(Lead Screw)

The lead screw 14 is configured to rotate on its axis to shift the first coupling portion 132B of the first paddle 132 in the seat-width direction, to thereby cause the hinge mechanism 13 to be operable. The lead screw 14 is provided with a screw thread in a part of the lead screw 14 in an axial direction.

The lead screw 14 is held by the second bearing portion 112 and the third bearing portion 113 so as not to move in the axial direction and a radial direction relative to the base 11. The lead screw 14 is coupled to the actuator 15.

(Actuator)

The actuator 15 is a driving source to rotate the lead screw 14 on its axis. A power to be used for the actuator 15 may be electricity, compressed air, or hydraulic pressure. The actuator 15 is held by the base 11.

(Support Portion)

As shown in FIGS. 2A and 2B, the support portion 16 is attached to the back frame 4, and supports the pressure-receiving plate 12 such that the pressure-receiving plate 12 can be displaced with respect to the back frame 4. The support portion 16 includes a frame body 161, a coupling rod 162, a hanging member 163, and a reinforcing member 164.

The frame body 161 is configured with a U-shaped rod member. An upper end of the frame body 161 is fixed to the upper panel 43 of the back frame 4. A lower end of the frame body 161 is fixed to the lower panel 44 of the back frame 4 via the coupling rod 162 extending in the left-right directions. The frame body 161 is fixed to the base 11.

The hanging member 163 is configured with an elastic rod member that is bent into a C-like shape, to thereby hang the pressure-receiving plate 12. The hanging member 163 is fixed to the frame body 161. The hanging member 163 supports the pressure-receiving plate 12 at a position upward of the base 11 and the hinge mechanism 13 such that the pressure-receiving plate 12 is pivotable in the seat front-rear directions.

Specifically respective two leading ends of the hanging member 163 are inserted, in the seat-width direction, through the first holder 121A and the second holder 121B of the pressure-receiving plate 12. The respective two leading ends of the hanging member 163 are inhibited from rotating on their axes by the first holder 121A and the second holder 121B.

The hanging member 163, which are held by the first holder 121A and the second holder 121B, is configured to be subjected to a torsional stress as the pressure-receiving plate 12 pivots toward the seat-front side. Thus, the hanging member 163 biases the pressure-receiving plate 12 with a resilient force so that the pressure-receiving plate 12 pivots toward the rear side.

The reinforcing member 164 is configured with a rod member extending in the seat-width direction. The reinforcing member 164 is fixed to the frame body 161 at a position upward of the hanging member 163. The reinforcing member 164 inhibits deformation of the frame body 161.

(Displacement of Pressure-Receiving Plate)

Figure 6A:
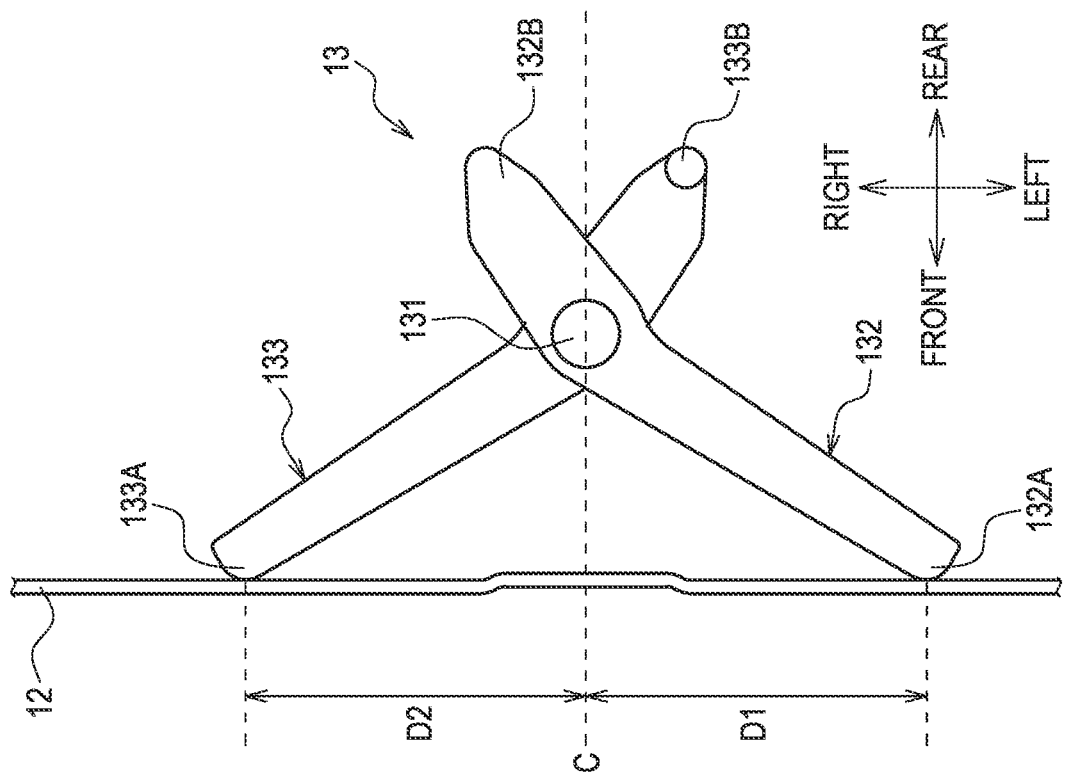
FIG. 6A is a schematic diagram showing the hinge mechanism in which a pressure-receiving plate is placed in a retracted position.
Figure 6B:
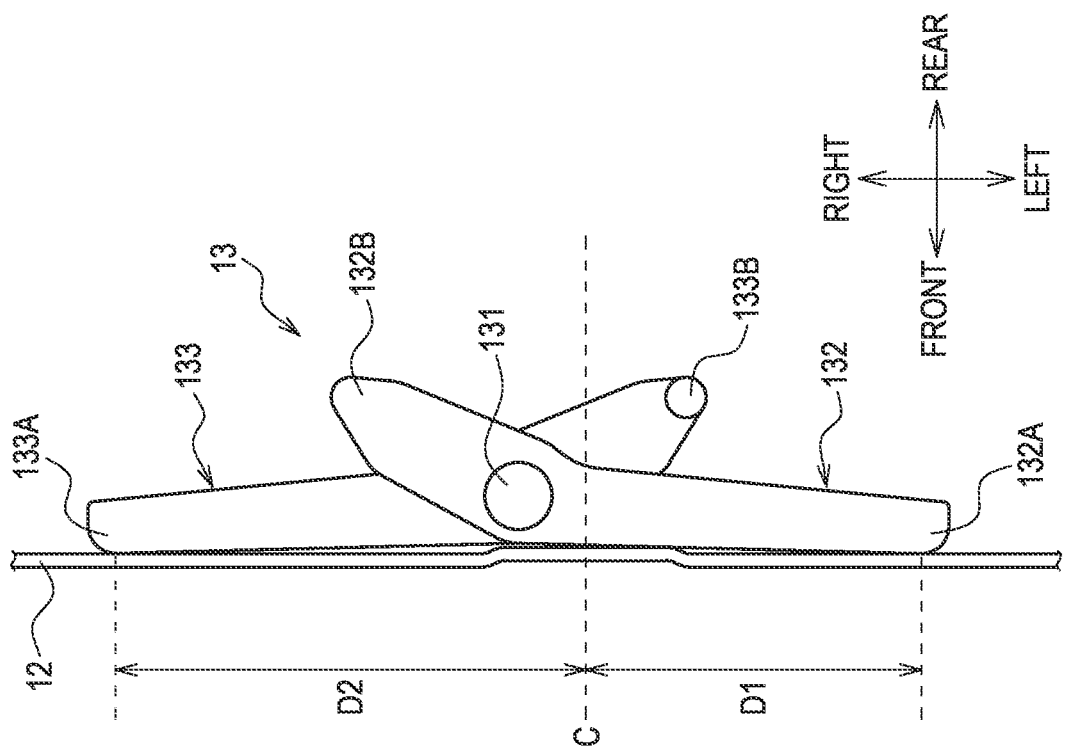
FIG. 6B is a schematic diagram showing the hinge mechanism in which the pressure-receiving plate is placed in a deployed position.

The pressure-receiving plate 12 is configured to be displaced via the hinge mechanism 13 between a retracted position shown in FIG. 6A and a deployed position shown in FIG. 6B. The deployed position is at the seat-front side relative to the retracted position.

The retracted position is at the rearmost position in a displaceable range of the pressure-receiving plate 12. When the pressure-receiving plate 12 is at the retracted position, the first coupling portion 132B of the first paddle 132 is located at the rightmost position in a movable range of the first coupling portion. 132B.

Moreover, when the pressure-receiving plate 12 is at the retracted position, the first paddle 132 contacts a rear surface of the pressure-receiving plate 12 in an area of the first paddle 132 ranging from the first pressing portion 132A to the portion coupled to the hinge pin 131. Furthermore, the second paddle 133 contacts the rear surface of the pressure-receiving plate 12 in an area of the second paddle 133 ranging from the second pressing portion 133A to the portion coupled to the hinge pin 131.

The first paddle 132 is coupled to the base 11 as a link via the hinge pin 131 and the second coupling portion 133B of the second paddle 133. Thus, the first pressing portion 132A of the first paddle 132 is displaced in the seat front-rear directions as the rotation of the lead screw 14 causes the first coupling portion 132B of the first paddle 132 (specifically, the nut 132D and the anteriorly arranged portion 132C rotatably coupled to the nut 132D) to move in the seat-width direction with respect to the base 11.

Accordingly, as the first coupling portion 132B moves toward a left side with the pressure-receiving plate 12 located at the retracted position, the first pressing portion 132A pivots toward the front side and the hinge pin 131, which is coupled to the first paddle 132, also moves toward the front side. Consequently, the second paddle 133, which is coupled to the hinge pin 131, also pivots about the second coupling portion 133B as a link, and the second pressing portion 133A moves toward the seat-front side in synchronization with the first pressing portion 132A.

In other words, as the first coupling portion 132B moves toward the left side, the first pressing portion 132A and the second pressing portion 133A simultaneously press the pressure-receiving plate 12 toward the seat-front side. As a result, the pressure-receiving plate 12 is displaced to the deployed position.

In accordance with the same mechanism, as the first coupling portion 132B moves toward the right side with the pressure-receiving plate 12 located at the deployed position, the first pressing portion 132A and the second pressing portion 133A are synchronized with each other and move toward the rear side. As the first pressing portion 132A and the second pressing portion 133A move toward the rear side, the pressure-receiving plate 12 is displaced toward the rear side (that is, toward the retracted position) as a result of being biased by the hanging member 163.

As shown in FIG. 6B, when the pressure-receiving plate 12 is at the deployed position, a center line C of the pressure-receiving plate 12 in the seat-width direction (that is, a center line of the seatback 3 in the seat-width direction) passes through the center of the hinge pin 131.

Thus, a first distance D1 from a portion of the first pressing portion 132A contacting the pressure-receiving plate 12 to an imaginary plane including the center line C is equal to a second distance D2 from a portion of the second pressing portion 133A contacting the pressure-receiving plate 12 to the imaginary plane including the center line C.

On the other hand, when the pressure-receiving plate 12 is at the retracted position, the center line C of the pressure-receiving plate 12 in the seat-width direction is located leftward of the center of the hinge pin 131 as shown in FIG. 6A. Thus, the first distance D1 is smaller than the second distance D2.

Accordingly, when the pressure-receiving plate 12 is at the retracted position, the hinge mechanism 13 is arranged closer to the right side with respect to the pressure-receiving plate 12. However, displacement of the pressure-receiving plate 12 to the deployed position causes the hinge mechanism 13 to support the pressure-receiving plate 12 from the rear side at a position bilaterally symmetrical with respect to the center line C.

1-2. Effects

The above-detailed embodiment can bring effects to be described below.

(1a) Of the first paddle 132 and the second paddle 133 configuring the hinge mechanism 13, only the first paddle 132 is shifted by the lead screw 14. Thus, it is possible to reduce a length of a screw thread to be provided to the lead screw 14. Moreover, it is not necessary to provide the second paddle 133 with a nut and therefore, a cost involved in the lumbar support device 10 is reduced.

(1b) The hinge pin 131 is arranged at the seat-front side relative to the base 11 whereby a configuration of the hinge mechanism 13 can by simplified. Consequently, such simplification promotes cost reduction of the lumbar support device 10.

(1c) The pressure-receiving plate 12 is supported by the support portion 16 in a pivotable manner in the seat front-rear directions. In a configuration, a supporting structure of the pressure-receiving plate 12 can be simplified and pushing of the pressure-receiving plate 12 can be facilitated.

(1d) In a state where the pressure-receiving plate 12 is at the retracted position, the first distance D1 and the second distance D2 are not equal to each other. With such a configuration, it is possible to move the pressure-receiving plate 12 in parallel with the seat front-rear directions without moving the second coupling portion 133B of the second paddle 133 in the seat-width direction.

2. Other Embodiments

The embodiment of the present disclosure has been described hereinabove. However, the present disclosure is not limited to the embodiment described above and may take various forms.

(2a) In the vehicle seat 1 of the above-described embodiment, the hinge pin 131 may be arranged at the seat-rear side relative to the base 11. In other words, the first paddle 132 and the second paddle 133 each may be arranged such that a part thereof may be located at the seat-rear side relative to the base 11.

(2b) In the vehicle seat 1 of the above-described embodiment, the pressure-receiving plate 12 may not necessarily be supported in a pivotable manner in the seat front-rear directions. Moreover, the pressure-receiving plate 12 may be biased toward the rear side (that is, toward the retracted position) via a mechanism other than the hanging member 163.

(2c) In the vehicle seat 1 of the above-described embodiment, the first paddle 132 may not necessarily include the anteriorly arranged portion 132C and the locking portion 132G.

(2d) The vehicle seat 1 of the above-described embodiment can be applied to seats other than the vehicle seat described above such as seats used in vehicles other than automobiles. Examples of such vehicles may include railroad vehicles, ships and boats, and aircrafts.

(2e) Functions of a single component in the aforementioned embodiments may be distributed to two or more components, or functions performed by a plurality of elements may be integrated by one component. A part of the configurations of the aforementioned embodiments may be omitted. At least a part of the configurations of the aforementioned embodiments may be added to or replaced with other configurations of another one of the aforementioned embodiments. Any and all modes that are encompassed in the technical ideas identified by the languages in the claims are embodiments of the present disclosure.

What is claimed is:

1. A lumbar support device configured to be attached to a back frame that supports a seatback, the lumbar support device comprising:
    a base fixed to the back frame;
    a pressure-receiving plate arranged at a seat-front side relative to the base;
    a hinge mechanism configured to move the pressure-receiving plate in seat front-rear directions with respect to the base; and
    a lead screw configured to cause the hinge mechanism to be operable, the hinge mechanism including:
        a hinge pin; and
        a first paddle and a second paddle coupled to each other via the hinge pin, the first paddle and the second paddle being configured to pivot about the hinge pin in the seat front-rear directions,
    the first paddle including:
        a first pressing portion configured to press the pressure-receiving plate toward the seat-front side; and
        a first coupling portion coupled to the lead screw so as to be shifted in a seat-width direction as the lead screw rotates, and
    the second paddle including:
        a second pressing portion configured to press the pressure-receiving plate toward the seat-front side; and
        a second coupling portion rotatably coupled to the base.

2. The lumbar support device according to claim 1, wherein the hinge pin is arranged at the seat-front side relative to the base.

3. The lumbar support device according to claim 1, further comprising
    a support portion attached to the hack frame, the support portion supporting the pressure-receiving plate at a position upward of the hinge mechanism such that the pressure-receiving plate is pivotable in the seal front-rear directions.

4. The lumbar support device according to claim 1,
    wherein the pressure-receiving plate is configured to be displaced, via the hinge mechanism, between a retracted position and a deployed position, the deployed position being at the seat-front side relative to the retracted position,
    wherein, when the pressure-receiving plate is at the deployed position, a first distance from a portion of the first pressing portion contacting the pressure-receiving plate to an imaginary plane including a center line of the pressure-receiving plate in the seat-width direction is equal to a second distance from a portion at the second pressing portion contacting the pressure-receiving plate to the imaginary plane, and
    wherein, when the pressure-receiving plate is at the retracted position, the first distance is different from the second distance.

* * * * *